Figure 1:
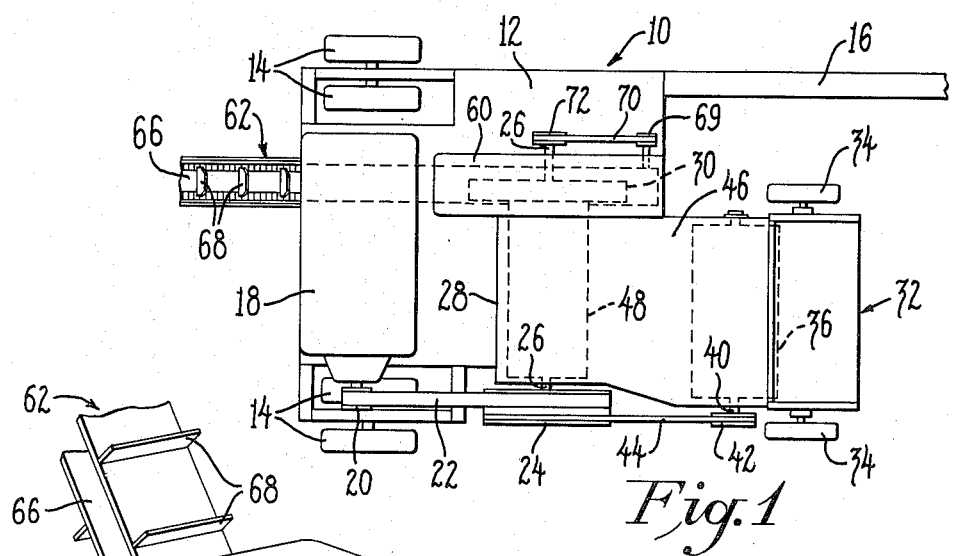

United States Patent Office 3,158,974
Patented Dec. 1, 1964

3,158,974
APPARATUS FOR WAFERING HAY
Merle H. Peterson and Stanley L. Lawrence, Livonia, Mich., assignors to Massey-Ferguson, Inc., Detroit, Mich., a corporation of Maryland
Filed May 14, 1962, Ser. No. 194,354
3 Claims. (Cl. 56—1)

This invention relates to an apparatus for producing hay wafers and, in particular, to an improved compact apparatus for field wafering forage crops into hay wafers of substantially uniform quality, constituency, length, shape and density for livestock feed.

In recent times, apparatus have been devised for field wafering forage crops into hay wafers comprising a main wheeled frame having coupled and projecting to one side thereof a wheeled rotary flail-type crop pick-up mechanism for supplying hay, preferably preconditioned or processed, finely chopped, mixed and blended hay from a windrow within a field, to a rotary hay compressing means mounted on a rearward portion of the frame and communicating with the entrance ends of an annular series of axially open radially extending die cells. An engine has been mounted on the forward portion of the main wheeled frame and power therefrom has been transmitted through belt and pulley arrangements to the rotary hay compressing means and from the latter to the rotary flail-type pick-up mechanism. Elevator type conveyor means have been associated with the die cells to receive wafers of compressed hay ejected therefrom, and have extended rearwardly beyond the main frame for disposal of such wafers. The overall width of an apparatus of the type aforementioned is considerable consisting as it does of the width of the main wheeled frame itself as well as the wheeled flail-type pick-up mechanism coupled to and projecting from one side of the main wheeled frame. As a result, such a prior type of apparatus consumes considerable storage or parking space and, under certain conditions of operation, is difficult to maneuver.

Thus, the present invention contemplates an improved apparatus of the general type aforementioned for making compressed hay wafers, and is particularly characterized by a wheeled rotary flail-type crop pick-up mechanism coupled to a wheeled main frame and extending generally forwardly of the path of forward travel thereof, and an engine mounted on a rearward portion of the wheeled main frame to the rear of a rotary hay compressing means and so arranged that the axes of said rotary flail-type crop pick-up mechanism, rotary hay compressing means and the engine are parallel and extend transversely of the main frame, and power is transmitted through belt and pulley means from the engine to the compressing means and from the latter to the crop pick-up mechanism. As a consequence, there is provided an apparatus in which the aforementioned crop pick-up mechanism, rotary hay compressing means, and engine are generally longitudinally aligned fore and aft of the wheeled main frame to provide a relatively narrow compact and maneuverable apparatus.

Figure 2:
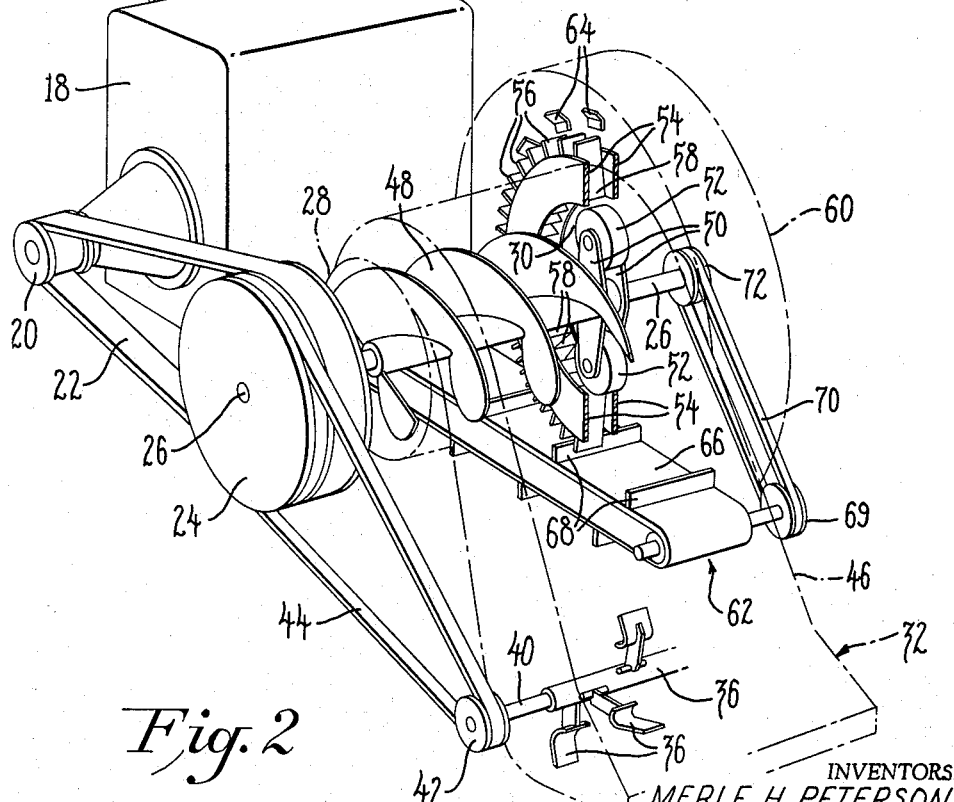

In order to facilitate an understanding of the invention, a preferred embodiment thereof will now be described with reference to the accompanying drawing in which:

FIGURE 1 is a top plan view of a hay wafering apparatus embodying the invention; and FIGURE 2 is an enlarged perspective view, partly in phantom and in section to illustrate certain details, of the apparatus of FIGURE 1.

Referring now to the drawings, the numeral 10 in FIGURE 1 generally indicates a hay wafering apparatus comprising a frame 12 equipped with ground-engaging wheel means 14 at the rearward end thereof in the usual manner, and a drawbar 16 projecting from one side of the forward end of the frame and adapted to be hitched in the usual manner to a suitable prime mover, such as an agricultural tractor, for drawing the frame along a field of mown hay.

A suitable power plant or engine 18 is mounted on and extends transversely of the frame 12 substantially at the rearward end thereof, and has its output shaft connected through a pulley 20 and belt 22 along one side of the frame to a large pulley or flywheel 24 secured to a horizontal drive shaft 26 extending transversely of the frame forward of the power plant or engine and suitably mounted for rotation in and extending entirely through a hopper 28 having one end communicating with an annular wafering chamber 30, both of which are suitably mounted on the frame 12. A pick-up mechanism for mown hay in the field is indicated generally at 32, is equipped with ground-engaging wheel means 34 in the usual manner and is suitably coupled in a conventional way to the frame 12 so as to extend beyond the forward end thereof alongside the drawbar 16. The pick-up mechanism 32 is of the type comprising a rotary flail means 36 including a plurality of spaced projecting flails or arms 38 secured to shaft 40 rotatably driven by the pulley 42 and belt 44 connected to the large pulley or flywheel 24 on the drive shaft as aforedescribed. A delivery chute 46 communicates the rotary flail means with a suitable opening in a wall of the hopper 28.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogeneous mass. As the apparatus is towed along the field, the hay mixture in a given windrow is picked up by the rotary flail means 36, the rapidly rotating flails or arms 38 of which are operable to direct the homogenized hay in an air stream into the delivery chute 46 which delivers the hay to the hopper 28.

A multiple flight feed auger 48 is secured on the drive shaft 26 for rotation therewith within the hopper 28. Radially extending arms 50 have their central portions suitably rigidly secured to the drive shaft 26 for rotation therewith within the wafering chamber 30, and have journaled at the opposite ends thereof a pair of rollers 52.

A pair of oppositely spaced annular die plates 54 are suitably supported coaxially with the wafering chamber 30 and drive shaft 26, and an annular or circumferentially spaced series of die plates 56 are fixedly disposed therebetween to form an annular or circumferentially spaced series of radially extending axially open die cells 58 between the annular die plates 54 and adjacent die plates 56. As will be apparent, the axes of the respective die cells 58 are contained in a plane perpendicular to the axis of rotation of the drive shaft 26 or, in other words, a vertical plane with the frame traversing a horizontal surface. Furthermore, the annular series of die cells are substantially coaxial with the drive shaft, and each includes an entrance end communicating with the wafering chamber 30 and an exit end axially spaced therefrom which communicates with an enlarged housing or shroud 60 enclosing a substantial portion of the wafering chamber and series of die cells and having a lower or bottom portion opening over the elevator type conveyor mechanism indicated generally at 62. Preferably, the die cells 58 converge in cross section from their entrance ends to their exit ends. A wafer breaking and ejection plate 64 is associated with the exit end of each of the die cells and extends obliquely to the axis of the latter, whereby a column of compacted hay emerging therefrom will engage the plate and be broken into a wafer which is then ejected to one side of the wafering chamber within the housing or shroud 60 so as to fall onto the elevator type conveyor mechanism 62.

As will now be apparent, the rollers 52 are positioned so as to be closely spaced to but not engage the entrance ends to the respective die cells 58. Thus, hay fed continuously by the auger 48 from the hopper 28 into the wafering chamber 30 is laid across the entrance ends of the respective die cells and the rollers compress the hay and force it into and through the respective die cells upon successive rotative passes of the rollers. As the rollers continue to rotate within the wafering chamber, hay is continuously compressed and forced into and through the respective die cells to form columns of compacted hay extending between the path of rotation of the rollers and the wafer breaking and ejection plates 64 adjacent the exit ends of the respective die cells. As a result of this process, the hay within each die cell is compacted and compressed therein into columns of substantially uniform quality, constituency, shape and density, the breaking and ejection plates acting to engage the end of the compacted column of hay emerging from the exit ends of the cells to break and eject therefrom successive wafers of hay of substantially uniform length.

As aforementioned, the wafers of hay so ejected from the die cells within the enlarged housing or shroud 60 are directed upon the elevator type conveyor mechanism 62 which includes belt means 66 equipped with spaced conveyor paddles 68 which pick up the wafers and convey them from the apparatus preferably into a trailing conveyance. The belt means 66 is adapted to be driven by a shaft secured to pulley 69 driven from a belt 70 entrained about another pulley 72 secured to the end of drive shaft 26 exteriorly of the wafering chamber 30 and enlarged housing or shroud 60. It will be further noted that the lower substantially horizontal flight of the elevator type conveyor extends longitudinally of the frame 12 from beneath the wafering chamber and housing or shroud and below the power plant or engine 18 to the rearward end of the frame, the remaining portion of the conveyor extending upwardly and rearwardly of the rearward end of the frame to facilitate delivery of the wafers into a trailing conveyance.

From the foregoing description, it will now be apparent that the homogenized mixture of hay including chopped, finely blended and mixed stems and leaves is delivered through the chute 46 to the hopper 28 and fed therefrom into the wafering chamber 30 by the feeding and centrifugal action of the auger 48. The hay is then laid along the entrance ends of the respective die cells 58 and the rollers 52 compress and force the collection of hay into and through the die cells to compact the hay into dense columns which, upon engaging the breaking and ejection plates 64, are successively broken into wafers of substantially uniform length which are ejected within the housing or shroud 60 onto the elevator type conveyor 62 for disposal as desired. The axes of the power plant or engine, wafering mechanism and pick-up mechanism are parallel and extend transversely of the frame 12, and are so arranged as to extend generally longitudinally of the frame 12, thereby providing a relatively narrow, compact and maneuverable construction.

The embodiments of the invention in which an exclusive property or privilege is claimed are defined as follows:

1. Apparatus for making compressed hay wafers from forage crops and comprising, in combination, a mobile frame having a longitudinal axis extending in the direction of travel of said frame, a series of die cells mounted on said frame, rotary hay compression means mounted on said frame and including a rotary drive shaft extending transversely of said axis thereof, said compression means being cooperable with said die cells to compress hay into and therethrough to form wafers, a power plant mounted on said frame to the rear of said compression means and extending substantially coextensively with the latter and including a rotary power output shaft extending parallel to said drive shaft of said compression means, crop pick-up means mounted on and projecting from the forward end of said frame in the forward path of travel thereof and including a rotary drive shaft extending parallel to said shafts of said compression means and power plant, and belt and pulley means transmitting power from said output shaft of said power plant to said drive shaft of said compression means and from the latter to said drive shaft of said pick-up means.

2. Apparatus for making compressed hay wafers from forage crops and comprising, in combination, a mobile frame having a longitudinal axis extending in the direction of travel of said frame, a series of die cells mounted on said frame, rotary hay compression means mounted on said frame and including a rotary drive shaft extending transversely of said axis thereof, said compression means being cooperable with said die cells to compress hay into and therethrough to form wafers, a power plant mounted on said frame to the rear of said compression means and extending substantially coextensively with the latter and including a rotary power output shaft extending parallel to said drive shaft of said compression means, crop pick-up means mounted on and projecting from the forward end of said frame in the forward path of travel thereof and including a rotary drive shaft extending parallel to said shafts of said compression means and power plant, and belt and pulley means transmitting power from said output shaft of said power plant to one end of said drive shaft of said compression means and from the latter to said drive shaft of said pick-up means, said belt and pulley means extending fore and aft of said frame to one side of the axis of the latter.

3. The apparatus according to claim 2 further comprising conveyor means for receiving wafers mounted on and extending longitudinally of said frame beneath said series of die cells and beneath said power plant and beyond the rearward end of said frame, and belt and pulley means disposed on the other side of said axis of said frame operatively connecting the other end of said drive shaft of said compression means to said conveyor means to transmit drive thereto.

References Cited in the file of this patent

UNITED STATES PATENTS

| 2,716,318 | Skromme | Aug. 30, 1955 |
| 2,870,481 | Bonnafoux | Jan. 27, 1959 |
| 2,887,718 | Curran et al. | May 26, 1959 |
| 3,015,199 | McKeon et al. | Jan. 2, 1962 |

FOREIGN PATENTS

| 1,250,174 | France | Nov. 28, 1960 |